Figure 1:
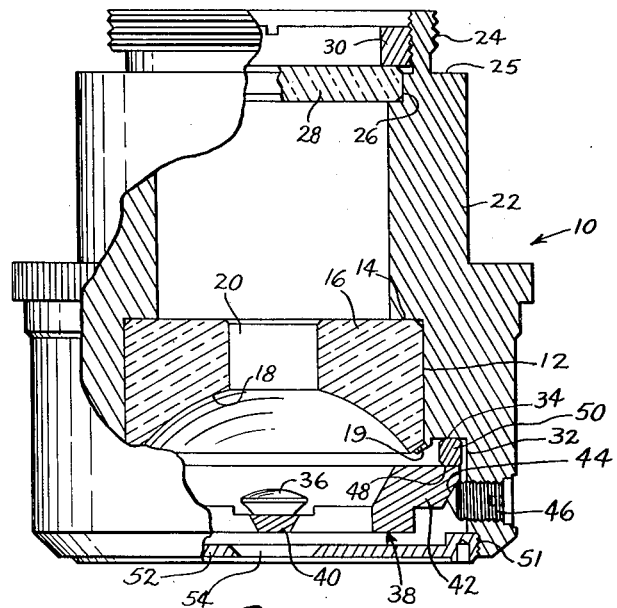

Oct. 16, 1951

E. J. MEYER 2,571,743

REFLECTING IMAGE-FORMING OPTICAL
SYSTEM FOR INSTRUMENTS
Filed May 20, 1950

INVENTOR
EDGAR J. MEYER
BY
ATTORNEYS

Patented Oct. 16, 1951

2,571,743

UNITED STATES PATENT OFFICE 2,571,743

REFLECTING IMAGE-FORMING OPTICAL SYSTEM FOR INSTRUMENTS

Edgar J. Meyer, Buffalo, N. Y., assignor to American Optical Company, Southbridge, Mass., a voluntary association of Massachusetts Application May 20, 1950, Serial No. 163,244

4 Claims. (Cl. 88—57)

This invention relates to optical instruments, and more particularly to mounting means for accurately supporting and aligning co-related reflecting optical elements of such instruments; such as the reflecting optical elements of a microscope objective or the like.

While reflecting image-forming optical systems are old, instruments embodying such systems are finding special utility at the present time particularly in the field of infra-red and ultra-violet miscroscopic research. This is partly because the light path through such an optical instrument can be arranged so as to be unobstructed by conventional refracting optical elements or the like, with the result that absorption of the light energy being transmitted may be maintained at a minimum. Also reflecting image-forming optical systems are highly advantageous in certain other instances since they are free from chromatic aberrations and the like.

In co-pending application 125,180, filed November 3, 1949, is described in considerable detail a reflecting type image-forming optical system for use as a microscope objective and a method by which this reflecting system may be accurately computed. The system employs two reflecting elements having spherical surfaces in order that it may be economically manufactured, notwithstanding the fact that all spherical surfaces inherently possess residual spherical aberration. The radii, spacings, diameters, aperture stop and such of the reflecting system of said co-pending application have been so accurately computed and formed that, if properly assembled in suitable mounting means, a reflecting system having a predetermined magnification, good resolution, and freedom from coma and distortion may be provided while maintaining the spherical aberration of the system so well balanced that highly acceptable results at relatively high numerical aperture may be obtained.

The mounting means or housing assembly of the present invention is accordingly constructed and arranged to accommodate such an optical system employing a pair of spherical reflectors, and is provided with means whereby their co-related reflecting surfaces may be accurately spaced and exactly centered relative to each other. Also the housing assembly is of a simple, inexpensive and efficient construction, embodying comparatively few parts, and so arranged that the attaching means therefor and the aperture stop of the system, will be accurately related to the said reflecting elements.

It is, accordingly, an object of the present invention to provide for use in an optical instrument, mounting means in the form of a housing assembly for accommodating a pair of co-related reflecting optical elements and which assembly may be readily supported by a suitable part of the optical instrument, with the housing serving to accurately position and space the reflecting elements relative to each other as well as protect same from dust, injury and the like.

Figure 2:
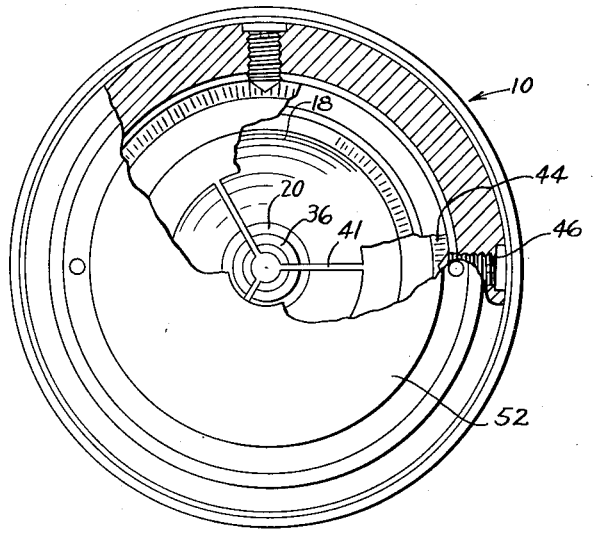

A better understanding of the invention will be had from the detailed description which follows when taken in conjunction with the accompanying drawing in which:

Fig. 1 is an elevational view, partly in section and partly broken away, showing details of a microscope objective of a reflecting type and embodying the present invention; and Fig. 2 is a bottom plan view, partly in section and partly broken away, of the objective of Fig. 1.

In Fig. 1 in detail there is shown a microscope objective embodying the present invention and comprising a main casing or housing 10 having at a central portion thereof an internal cylindrical surface 12 of accurate predetermined diameter and adjacent this surface a second annular surface 14 is arranged and angularly disposed, preferably at right angles, relative thereto so as to provide together an annular recess in the housing into which a relatively large concave reflecting element 16 may be disposed and accurately centered by engagement with these surfaces 12 and 14. This concave element is provided upon its lower surface with a reflecting surface 18, preferably spherical for economy, although it could be aspheric if desired, and a turned annular edge 19 is shown for retaining element 16 in place. Through a central portion of element 16 extends an aperture 20 for the passage of image-forming light rays as will be hereinafter described. Disposed above the portion of the housing recessed to accommodate the reflector 16 is a hollow extension 22 provided with a threaded upper end 24 and shoulder 25 accurately formed and spaced relative to the surfaces 12 and 14 so as to be received by the threaded portion on the lower end of a conventional microscope body tube or the like. Within the extension 22 adjacent the upper end thereof is formed a shallow recess 26 into which a transparent plate-like dust shield 28 or the like may be placed. The shield is preferably formed of fluorite, quartz or equivalent material if the objective is to be used for ultra-violet microscopy, and this shield is held in position by a retaining ring 30 screw-threaded into the upper end of the housing.

Below the cylindrical surface 12 in the housing 10 is formed a second cylindrical surface 32 of somewhat greater diameter than surface 12 and adjacent and above the surface 32 is provided a cooperating abutment surface 34, preferably formed at right angles relative to the cylindrical surface 32 so as to jointly define a second larger annular coaxial recess for accommodating spacing and supporting means for a relatively small convex reflector 36. While the reference surfaces upon the casing 10 and the supporting surfaces upon the reflectors 16 and 36 may be fairly accurately machined or otherwise formed, it has been found, nevertheless, most desirable to provide suitable means which will readily and economically allow accurate spacing and aligning of the small reflecting element 36 relative to the larger reflector 16.

This aligning and spacing means of necessity must be of such construction that not only may the center of curvature of the convex reflector 36 be accurately positioned upon the optical axis established by the spherical surface of reflector 16 but also must be provided with means whereby the position of reflector 36 along this optical axis may be accurately established for reasons clearly set forth in said co-pending application. The aligning and spacing means accordingly comprises a spider-like apertured supporting frame 38 having a central disc-like portion 40 upon which the convex reflector is cemented or otherwise secured. Thin supporting arms 41, preferably three, extend from portion 40 to an outer peripheral portion 42 having an annular beveled surface 44 formed upon its lower side for engagement by a set of preferably four centering screws 46 carried in the casing 10. A second annular surface 48 of the frame 38 is arranged to bear upwardly against a spacing ring 50 of very exact predetermined thickness. The exact thickness of this ring, as required by the reflectors and their position when mounted in the assembly, may be readily provided by slight honing of either face of the ring 50. In one example described in said co-pending application, the centers of curvature of the convex and concave reflectors should be substantially the same for best results. The thickness of the ring 50 may be used to effect this condition.

Since the supporting frame 38 must be shiftable slightly laterally in all directions by adjustment of the centering screws 46, this frame is made slightly less in diameter than that of recess 32 into which it fits. Accordingly, when the spacing ring 50 and frame 38 have been positioned in the recess 32 and the screws 46 moved inwardly, the ring will be maintained in engagement with surface 34 and the reflector 36 will be moved in an upwardly direction toward the concave reflector 16 and held at its correct predetermined spacing relative thereto, and at the same time, may be shifted by said screws laterally in the required direction until the center of curvature of the small reflector is coincident with the axis of the concave reflector, and in some cases coincident with the center of curvature thereof.

The open lower end of the casing 10 is slightly greater in size than the diameter of recess 32, as indicated at 51, and threads are formed therein so that cover 52 may be screw-threaded into position in this opening, at which time a central aperture 54 in said cover will provide an entrance through which image-forming light rays may enter said casing 10. This aperture 54 may be made of such predetermined size as to form an aperture stop for the system and also function to exclude stray light which might otherwise enter the optical system and interfere with the imagery provided thereby. The assembly is intentionally made of such proportions that the aperture in the cover 52 will be disposed substantially in the transverse plane containing the centers of curvature of the reflectors, this being the best location at which to position the aperture stop for the system.

When the casing and optics are assembled and positioned upon the lower end of a body tube or the like and disposed at a proper distance from an object to be inspected, light from said object will pass upwardly as a cone of rays, except for the small amount blocked out by the small reflector 36 and the arms 41, to the concave reflecting surface 18 where it will be reflected downwardly toward the convex mirror 36, from which it will be again reflected upwardly through the aperture 20 and to the image plane (not shown) of the objective in the upper part of the microscope body tube for observation by an eye lens, or for photomicrographic purposes, or the like. It will be appreciated that the light path from the object to the image plane of the objective, accordingly, will be unobstructed by conventional refracting lens elements or the like, and in cases where certain types of light, such as infra-red and ultra-violet are to be used, a thin plate of quartz or other suitable material having acceptable transmission characteristics may be employed as the transparent plate 28. Since the image-forming rays from the convex reflector 36 will pass through this plate nearly at right angles thereto substantially no refraction of the rays will occur to affect the image being formed.

Having described my invention, I claim:

1. An assembly for housing and positioning reflecting optical elements in an optical system, said assembly comprising a hollow casing having an accurately formed cylindrical surface therein, an annular surface adjacent and so angularly disposed relative to said cylindrical surface as to define therewith an annular recess within said casing, a relatively large concave reflector positioned in said recess in engagement with said surfaces, said reflector having a concaved reflecting surface establishing an optical axis which is substantially coincident with the axis of said cylindrical surface, said casing having hollow portions extending axially in opposite directions from said cylindrical portion and said concave reflector, the hollow portion lying on the side of said reflector away from said concaved surface having screw threads substantially concentric with the optical axis of said concave reflector for attachment to suitable external means for supporting said assembly, the other of said hollow portions having a second annular surface formed therein of greater transverse dimensions than the diameter of said cylindrical surface, an abutment surface angularly disposed relative to said second annular surface and defining therewith a second annular recess, a relatively small convex reflector in said casing and facing the reflecting surface of said concave reflector, positioning means for supporting said convex reflector in predetermined spaced relation to said concave reflector, said positioning means being received in said second recess and including apertured frame means, and readily adjustable means carried by said casing and engageable with said frame means for laterally shifting and centering said frame means and said convex reflector relative to said optical axis and for retaining said positioning means in engagement with said abutment surface.

2. An assembly for housing and positioning reflecting optical elements in an optical system, said assembly comprising a hollow casing having an accurately formed cylindrical surface therein, an annular surface adjacent and so angularly disposed relative to said cylindrical surface as to define therewith an annular recess within said casing, a relatively large concave reflector positioned in said recess in engagement with said surfaces, said reflector having a concaved reflecting surface establishing an optical axis which is substantially coincident with the axis of said cylindrical surface, said casing having hollow portions extending axially in opposite directions from said cylindrical portion and concave reflector, the hollow portion lying on the side of said reflector away from said concaved surface having screw threads substantially concentric with the optical axis of said concave reflector for attachment to suitable external means for supporting said assembly, the other of said hollow portions having a second annular surface formed therein of greater transverse dimensions than the diameter of said cylindrical surface, an abutment surface angularly disposed relative to said second annular surface and deflecting therewith a second annular recess, a relatively small convex reflector in said casing and facing the reflecting surface of said concave reflector, positioning means for supporting said convex reflector in predetermined spaced relation to said concave reflector, said positioning means being received in said second recess and including apertured frame means, readily adjustable means carried by said casing and engageable with said frame means for laterally shifting and centering said frame means and said convex reflector relative to said optical axis and retaining said positioning means in engagement with said abutment surface, and a centrally apertured cover carried by the last mentioned hollow portion of said casing outwardly of said frame means and providing an aperture stop for light rays entering said assembly.

3. An assembly for housing and positioning reflecting optical elements in an optical system, said assembly comprising a hollow casing having an accurately formed cylindrical surface therein, an annular surface adjacent and so angularly disposed relative to said cylindrical surface as to define therewith an annular recess within said casing, a relatively large concave reflector positioned in said recess in engagement with said surfaces, said reflector having a concaved reflecting surface establishing an optical axis which is substantially coincident with the axis of said cylindrical surface, said casing having hollow portions extending axially in opposite directions from said cylindrical portion and said concave reflector, the hollow portion lying on the side of said reflector away from said concaved surface having screw threads substantially concentric with the optical axis of said concave reflector for attachment to suitable external means for supporting said assembly, the other of said hollow portions having a second annular surface formed therein of greater transverse dimensions than the diameter of said cylindrical surface, an abutment surface angularly disposed relative to said second annular surface and defining therewith a second annular recess, a relatively small convex reflector in said casing and facing the reflecting surface of said concave reflector, positioning means for supporting said convex reflector in predetermined spaced relation to said concave reflector, said positioning means including a removable ring-like spacer member received in said second recess and an apertured frame member engageable therewith, and readily adjustable means carried by said casing and engageable with said frame member for laterally shifting and centering said frame member and convex reflector relative to said optical axis and for retaining said ring-like member in engagement with said abutment surface.

4. An assembly for housing and positioning reflecting optical elements in an optical system, said assembly comprising a hollow casing having an accurately formed cylindrical surface therein, an annular surface adjacent and so angularly disposed relative to said cylindrical surface as to define therewith an annular recess within said casing, a relatively large concave reflector positioned in said recess in engagement with said surfaces, said reflector having a concaved reflecting surface establishing an optical axis which is substantially coincident with the axis of said cylindrical surface, said casing having hollow portions extending axially in opposite directions from said cylindrical portion and said concave reflector, the hollow portion lying on the side of said reflector away from said concaved surface having screw threads substantially concentric with the optical axis of said concave reflector for attachment to suitable external means for supporting said assembly, the other of said hollow portions having a second annular surface formed therein of greater transverse dimensions than the diameter of said cylindrical surface, an abutment surface angularly disposed relative to said second annular surface and defining therewith a second annular recess, a relatively small convex reflector in said casing and facing the reflecting surface of said concave reflector, positioning means for supporting said convex reflector in predetermined spaced relation to said concave reflector, said positioning means including a removable ring-like spacer member received in said second recess and an apertured frame member engageable therewith, readily adjustable means carried by said casing and engageable with said frame member for laterally shifting and centering said frame member and convex reflector relative to said optical axis and for retaining said ring-like member in engagement with said abutment surface, and a centrally apertured cover carried by the last mentioned hollow portion of said casing outwardly of said frame member and providing an aperture stop for light rays entering said system.

EDGAR J. MEYER.

REFERENCES CITED

The following references are of record in the file of this patent:

UNITED STATES PATENTS

| Number | Name | Date |
| --- | --- | --- |
| 1,476,717 | Kandler et al. | Dec. 11, 1923 |
| 1,724,527 | Spierer | Aug. 13, 1929 |
| 1,840,448 | Heine | Jan. 12, 1932 |
| 1,971,061 | Bauersfeld | Aug. 21, 1934 |
| 2,198,014 | Ott | Apr. 23, 1940 |
| 2,413,286 | Buchele | Dec. 31, 1946 |
| 2,478,762 | Johnson | Aug. 9, 1949 |

FOREIGN PATENTS

| Number | Country | Date |
| --- | --- | --- |
| 285,426 | Germany | June 30, 1915 |